United States Patent
Choudhury et al.

(10) Patent No.: US 10,396,375 B2
(45) Date of Patent: Aug. 27, 2019

(54) SYSTEM AND METHOD FOR CONDITION MONITORING OF REDOX FLOW BATTERIES USING DATA ANALYTICS

(71) Applicant: International Business Machines Corporation, Armonk, NY (US)

(72) Inventors: Anamitra Roy Choudhury, Kolkata (IN); Sampath Dechu, Bangalore (IN); Pratyush Kumar, Chennai (IN)

(73) Assignee: INTERNATIONAL BUSNIESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 15/080,127

(22) Filed: Mar. 24, 2016

(65) Prior Publication Data

US 2017/0279140 A1    Sep. 28, 2017

(51) Int. Cl.
*H01M 8/04298*    (2016.01)
*H01M 8/18*    (2006.01)
(Continued)

(52) U.S. Cl.
CPC ....... *H01M 8/04305* (2013.01); *H01M 8/008* (2013.01); *H01M 8/0432* (2013.01); *H01M 8/0482* (2013.01); *H01M 8/04477* (2013.01); *H01M 8/04544* (2013.01); *H01M 8/04574* (2013.01); *H01M 8/04992* (2013.01);
(Continued)

(58) Field of Classification Search
CPC ............. H01M 8/04305; H01M 8/008; H01M 8/0432; H01M 8/04477; H01M 8/04544; H01M 8/04574; H01M 8/0482; H01M 8/04992; H01M 8/188; H01M 8/20; H01M 8/225
See application file for complete search history.

(56) References Cited

U.S. PATENT DOCUMENTS

| | | | |
|---|---|---|---|
| 4,024,523 | A | 5/1977 | Arnold et al. |
| 4,025,916 | A | 5/1977 | Arnold et al. |
| (Continued) | | | |

FOREIGN PATENT DOCUMENTS

| | | |
|---|---|---|
| CN | 101839964 A | 9/2010 |
| CN | 202126489 U | 1/2012 |
| (Continued) | | |

OTHER PUBLICATIONS

Corcuera, Sara et al., "State-of-Charge Monitoring and Electrolyte Rebalancing Methods for the Vanadium Redox Flow Battery", Eur. Chem. Bull. (ECB), 2012, vol. 1, No. 12, pp. 511-519.
(Continued)

*Primary Examiner* — Seahvosh Nikmanesh
(74) *Attorney, Agent, or Firm* — Ference & Associates LLC

(57) ABSTRACT

One embodiment provides a method for predicting maintenance of a redox flow battery, the method including: receiving, from a plurality of sensors, data regarding characteristics of the redox flow battery; weighting, using a processor, each of the characteristics to form an estimated state parameter for the redox flow battery; and determining, using the processor, a maintenance action for the redox flow battery using the estimated state parameter. Other aspects are described and claimed.

20 Claims, 4 Drawing Sheets

(51) Int. Cl.
  *H01M 8/20* (2006.01)
  *H01M 8/0432* (2016.01)
  *H01M 8/04537* (2016.01)
  *H01M 8/0444* (2016.01)
  *H01M 8/04791* (2016.01)
  *H01M 8/008* (2016.01)
  *H01M 8/04992* (2016.01)
  *H01M 8/22* (2006.01)

(52) U.S. Cl.
  CPC ............. *H01M 8/188* (2013.01); *H01M 8/20* (2013.01); *H01M 8/225* (2013.01); *H01M 2250/10* (2013.01)

(56) References Cited

U.S. PATENT DOCUMENTS

| | | | |
|---|---|---|---|
| 5,047,961 | A | 9/1991 | Simonsen |
| 5,175,531 | A | 12/1992 | Whitmire et al. |
| 5,349,535 | A | 9/1994 | Gupta |
| 6,384,576 | B1 | 5/2002 | Jokinen |
| 6,998,819 | B2 | 2/2006 | Jin |
| 7,199,550 | B2 | 4/2007 | Tsutsui et al. |
| 7,820,321 | B2 | 10/2010 | Horne et al. |
| 8,349,477 | B2 | 1/2013 | Parakulam et al. |
| 8,916,281 | B2 * | 12/2014 | Chang ............... H01M 10/4242 429/101 |
| 2011/0081562 | A1 | 4/2011 | Parakulam et al. |
| 2015/0195192 | A1 | 7/2015 | Vasseur et al. |

FOREIGN PATENT DOCUMENTS

| | | |
|---|---|---|
| CN | 202127424 U | 1/2012 |
| CN | 202523800 U | 11/2012 |
| CN | 103323696 A | 9/2013 |
| EP | 2634889 A1 | 9/2013 |
| WO | WO2014159506 A1 | 10/2014 |

OTHER PUBLICATIONS

Al-Fetlawi, H. et al., "Modelling the effects of oxygen evolution in the all-vanadium redox flow battery", Electrochimica Acta, 2010, 14 pages, Elsevier Ltd.

Shah, A.A. et al., "Dynamic modelling of hydrogen evolution effects in the all-vanadium redox flow battery", Electrochimica Acta, 2009, 15 pages, Elsevier Ltd.

* cited by examiner

SYSTEM AND METHOD FOR CONDITION MONITORING OF REDOX FLOW BATTERIES USING DATA ANALYTICS

BACKGROUND

A redox (reduction-oxidation) flow battery is a rechargeable battery or fuel cell that includes liquid electrolytes within tank(s). The liquid electrolytes are separated from one another, e.g., by a selective membrane, to promote ion exchange and thus electric current flow. A redox flow battery's separable liquids provide increased longevity as compared to other battery types.

The redox flow battery may be recharged by pumping additional electrolyte solution through the cell(s). The redox flow battery also permits capture and recycling of spent electrolyte solution. The redox flow battery is therefore akin to other electrochemical cells, but provides externally stored electrolyte solution to a reactor in order to generate electricity, rather than having ionic solution stored in the cell around the electrodes.

Redox flow battery energy capacity, e.g., measured as the amount of current that is produced, is a function of the amount of electrolyte that is available. Thus, redox flow batteries, e.g., connected to a commercial power grid or other power supply as a backup energy generation system or power source, are often quite large in size. For example, a redox flow electrolyte tank may contain many liters or gallons of electrolyte fluid.

BRIEF SUMMARY

In summary, one aspect of the invention provides a method for predicting maintenance of a redox flow battery, the method comprising: receiving, from a plurality of sensors, data regarding characteristics of the redox flow battery; weighting, using a processor, each of the characteristics to form an estimated state parameter for the redox flow battery; and determining, using the processor, a maintenance action for the redox flow battery using the estimated state parameter.

Another aspect of the invention provides an apparatus for predicting maintenance of a redox flow battery, the apparatus comprising: at least one processor; and a computer readable storage medium having computer readable program code embodied therewith and executable by the at least one processor, the computer readable program code comprising: computer readable program code that receives, from a plurality of sensors, data regarding characteristics of the redox flow battery; computer readable program code that weights each of the characteristics to form an estimated state parameter for the redox flow battery; and computer readable program code that determines a maintenance action for the redox flow battery using the estimated state parameter.

An additional aspect of the invention provides a computer program product for predicting maintenance of a redox flow battery, the computer program product comprising: a computer readable storage medium having computer readable program code embodied therewith, the computer readable program code being executable by a processor and comprising: computer readable program code that receives, from a plurality of sensors, data regarding characteristics of the redox flow battery; computer readable program code that weights each of the characteristics to form an estimated state parameter for the redox flow battery; and computer readable program code that determines a maintenance action for the redox flow battery using the estimated state parameter.

A further aspect of the invention provides a system for predicting maintenance of a redox flow battery, the method comprising: a redox flow battery operatively coupled to a commercial power grid; and an apparatus comprising: at least one processor; and a computer readable storage medium having computer readable program code embodied therewith and executable by the at least one processor, the computer readable program code comprising: computer readable program code that receives, from a plurality of sensors, data regarding characteristics of the redox flow battery; computer readable program code that weights each of the characteristics to form an estimated state parameter for the redox flow battery; and computer readable program code that determines a maintenance action for the redox flow battery using the estimated state parameter.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
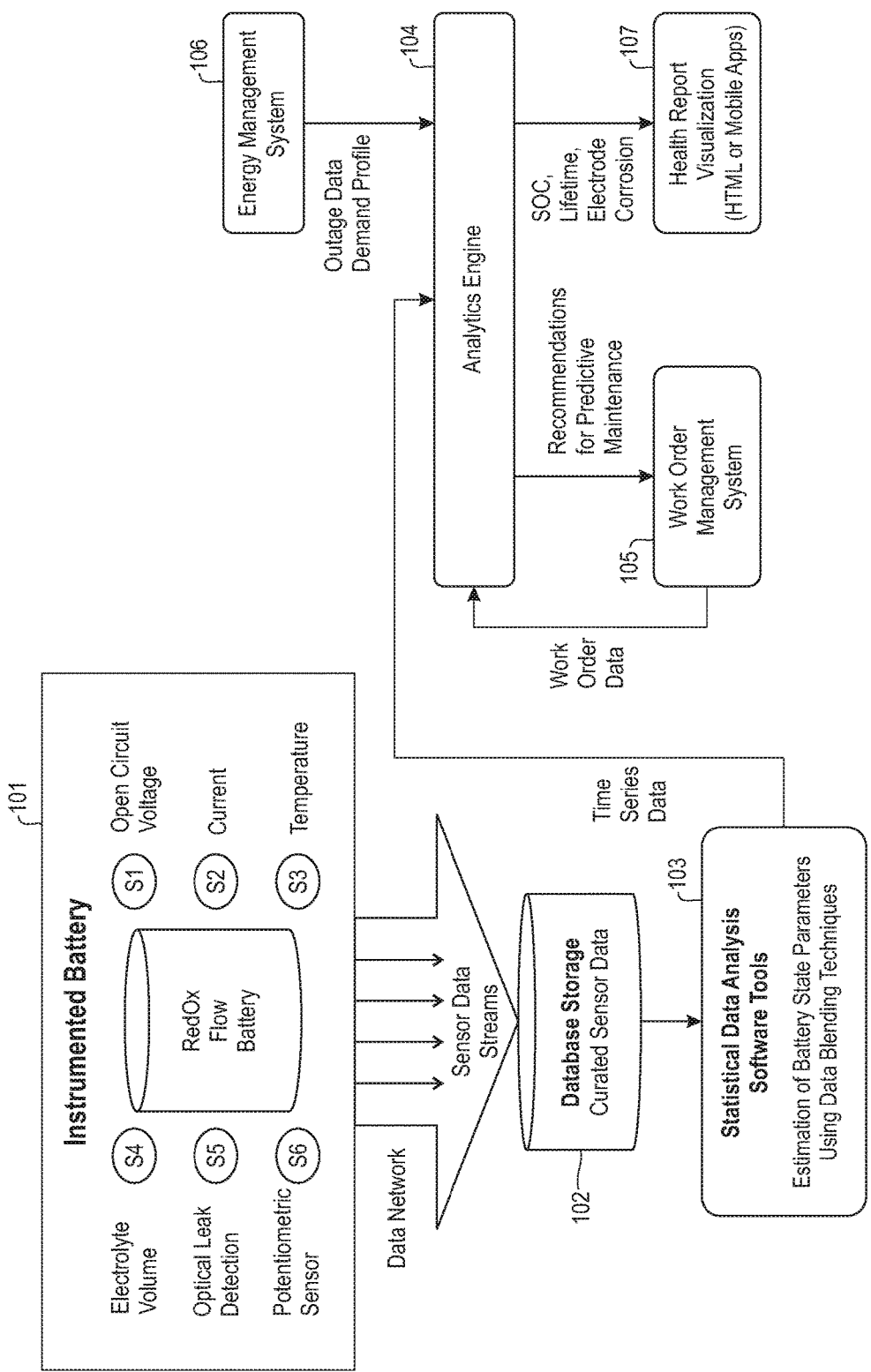
FIG. 1 illustrates an example of a system for condition monitoring of redox flow batteries using data analytics.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

A redox flow battery has many subsystems with multiple points of failure, including electrolyte tanks, pumps, cell stacks, electrodes, etc. Redox flow batteries require maintenance with multiple work order types, which contribute to improving related battery parameters. Examples of maintenance actions include but are not necessarily limited to remixing of the electrolyte solution, electrode replacement, chemical cleaning of the electrodes, fixing of tank leaks, addition of chemicals (e.g., addition of a reductant to an electrolyte solution), refilling of inert gas, tank or pump replacement, etc.

Additionally, a redox flow battery has multiple physical properties that can be sensed to derive an estimate of the battery's health. Many of the maintenance actions cannot be predicted by direct measurement. That is, a sensor may provide a measured characteristic regarding the redox flow battery; however, this sensor characteristic does not map directly to a particular condition that calls for a particular maintenance action. To integrate multiple subsystems with multiple sensors, an Internet-of-Things (IOT) platform is called for.

Moreover, some of the maintenance tasks require taking the redox flow battery offline. This can be problematic if the redox flow battery is needed, e.g., to supply alternate or additional power to a commercial power supply. Thus, complex troubleshooting is often required to identify a correct maintenance action. Further, complex scheduling is often required to complete the maintenance action in an appropriate time frame.

Accordingly, an embodiment provides an IOT-based battery management system for redox flow batteries to sense characteristics of the redox flow battery, monitor the condition thereof, and plan maintenance actions using data analytics techniques. In an embodiment, the redox flow battery system is provided with sensors such as temperature, open circuit voltage, current, electrolyte volume, optical leak, optical color, and potentiometric sensors. Data analytics techniques are applied to the sensor readings to estimate a state parameter of interest for the redox flow battery, e.g., the state of charge.

In an embodiment, aggregation of the sensor data, e.g., through a communication backend into a unified data storage system such as DB2 or INFORMIX data storage system, permits application of data blending techniques to the different sensor values in order to estimate state parameter(s) of the battery, such as state of charge. By accurately estimating a state parameter, e.g., one which may not be directly measurable by any particular sensor, an embodiment may recommend predictive maintenance work actions by taking into account the current state parameter, e.g., the redox flow battery's state of charge in a given operating condition, timeframe, etc.

The predictive maintenance action(s) therefore may be based on an estimated real-time battery state and battery evolution models, e.g., learned from past work order data and battery operations data. An embodiment optimizes the maintenance schedule using work order data from a work order database, e.g., to select an appropriate type of maintenance action, a particular duration and/or a timing thereof, etc. Energy operations data such as load shedding, demand, and the like from an energy management system may be utilized in optimizing a predicted maintenance action. Battery specific data, e.g., analysis of logged battery health reports, may additionally be taken into account when predicting characteristics of the redox flow battery, e.g., the remaining battery lifetime, as well as optimizing the predictive maintenance task(s) necessary.

FIG. 1 depicts a system overview according to an embodiment. As illustrated in FIG. 1, an instrumented redox flow battery 101 is provided with a plurality of sensors, i.e., sensors S1-S6. The sensors S1-S6 are utilized to measure characteristics of the redox flow battery 101. For example, sensor S1 may be a sensor that senses open circuit voltage, sensor S2 may be a sensor that senses current, sensor S3 may be a sensor that senses temperature, sensor S4 may be a sensor that senses electrolyte volume, sensor S5 may be an optical leak detector, and sensor S6 may be a potentiometric sensor. As will be appreciated by those having ordinary skill in the art, more or fewer sensors may be utilized, in various combinations, depending on the state parameter of interest, as further described herein.

The sensors S1-S6 report sensed data, e.g., over a network connection such as a wide area network (WAN) or a wireless wide area network (WWAN) to a database 102. The database 102 may store curated sensor data that are organized into structured data according to a database schema such as DB2 or HDFS (Hadoop file storage).

Figure 4:
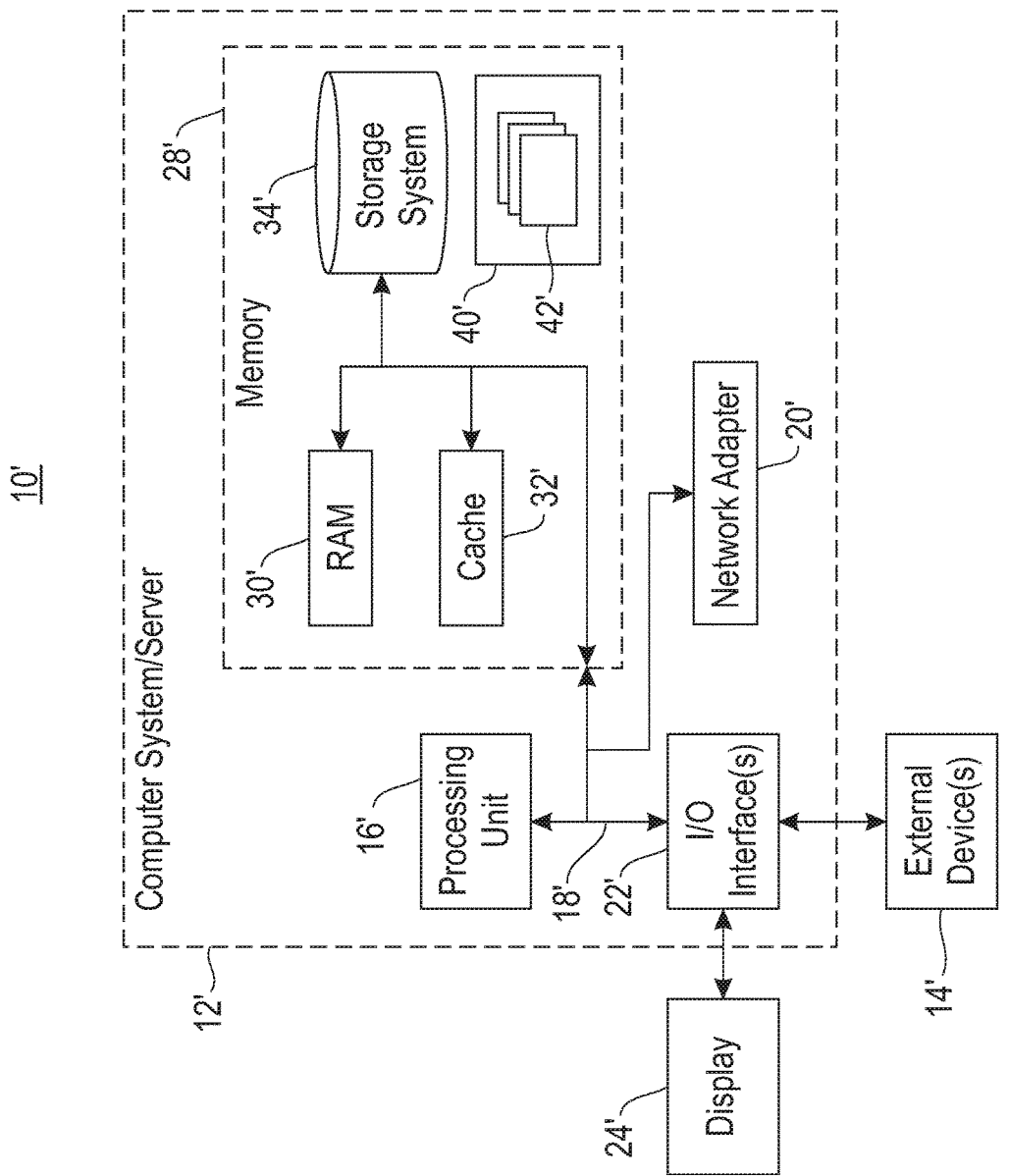
FIG. 4 illustrates a computer system.

The sensor data are utilized by state parameter estimation statistical software 103, e.g., running on an apparatus such as that outlined by way of example in FIG. 4 and running statistical software such as IBM SPSS (statistical package for social sciences) or R statistical software, to estimate a state parameter of the redox flow battery 101. By way of non-limiting example, the state parameter estimation software 103 may utilize the sensor data to estimate a state parameter of the redox flow battery 101 such as state of charge. It will be recognized based on the disclosure provided herewith that this is a non-limiting example of a useful state parameter. Other useful state parameters in predicting maintenance may be estimated utilizing sensor data.

In an embodiment, aggregated sensor data in the database 102, as sensed from an instrumented redox flow battery 101 having multiple sensors S1-S6 that stream the sensor data to the database 102 using a communication infrastructure, is read from the database 102 and blended to derive estimated battery state parameter(s) by estimation software 103. Time series observations of the redox flow battery's 101 estimated state parameter(s) are communicated to an analytics engine 103, e.g., an IBM SPSS analytics engine.

Historical work order data from a work order management system 105, e.g., running IBM MAXIMO asset management software, e.g., data regarding the redox flow battery's 101 maintenance history, is also communicated to the analytics engine 104, e.g., running IBM SPSS or COGNOS business intelligence software. Energy operations schedule data are communicated from an energy management system 106 to the analytics engine 104.

The analytics engine 104 uses the historical work order data from the work order management system 105 and the observed battery state parameters from the estimation software 103 for reporting on the health of the redox flow battery 101, e.g., via communication to an application running on a mobile device 107.

An embodiment uses the historical work order data, the observed battery state parameters, and utilities operation information (from energy management system 106) for optimally raising new work orders for a predictive maintenance action for the redox flow battery 101. Thus, the monitored state parameter estimate(s) inform the correct maintenance action to be taken, which will be selected in an intelligent fashion based on prior work order(s), if any, and in view of any impending system-wide impacts, e.g., as learned from the energy management system 106.

In an embodiment, state parameter estimation utilizes data blending techniques, which are applied by the state parameter estimation software 103, to improve the state parameter estimation. The data blending techniques apply, for example, a weighting to the sensed data such that a pertinent state parameter of the redox flow battery 101, e.g., the state of charge, is estimated more accurately. A non-limiting example of parameter state estimation via data blending is as follows.

In a set up or calibration phase, a model or models may be trained such that machine learning techniques may be brought to bear on the state parameter estimation problem, e.g., utilizing data from the sensors S1-S6. During the calibration phase, the redox flow battery 101 is charged and discharged at constant current rate and the state of charge is calibrated as function of each sensor data, e.g., from sensors S1-S6. Thus, in an embodiment, the periodic constant-current charge and discharge cycles of battery may be recorded, using a Coulomb meter or like sensor, such that an embodiment may measure the charge sent to and received from the redox flow battery 101 to obtain a baseline value for the state of charge, hereinafter denoted $S_{(t)}$.

A temperature sensor, e.g., sensor S3 of FIG. 1, provides a temperature reading, $T_{(t)}$, from a relevant portion of the redox flow battery 101. Conductivity measured in the electrolyte half-cells of the redox flow battery 101, denoted as $K_{(t)}$, are also obtained. Potentiometer data, $V_{(t)}$, measures the potential difference in the half-cells of the redox flow battery 101. Optical sensors measure refractive index and hence the color, $C_{(t)}$, of the electrolytes in the half cells of the redox flow battery 101 (common colors are yellow, blue, green, and purple).

Having the various sensor data, e.g., as stored in a database such as 102 of FIG. 1, an embodiment may apply an estimation phase. In the estimation phase, each sensor data are used to estimate the state of charge of the redox flow battery 101.

Estimated values of state of charge using different sensor data have different accuracies, e.g., depending on various operating conditions of the redox flow battery 101, such as the temperature. Machine learning algorithms are used to find weights for each estimated value of the state of charge. For example, an embodiment may train a regression model for estimating the state of charge using $V_{(t)}$ (potentiometric sensor data) and $K_{(t)}$ (conductivity sensor data), as follows.

For conductivity, $K_{(t)}$, estimation of state of charge, $S_{(t)}$, a regression model such as the following may be used, where b is a constant determined during regression:

$$S_K(t) = a*K_{(t)} + b$$

A regression model may also be trained for estimating state of charge $S_{(t)}$ using $V_{(t)}$, as follows, where $S_p(t)$ is a charge estimation using $V_{(t)}$ and d is a constant determined during regression:

$$S_P(t) = c*V_{(t)} + d$$

These models give estimations of state of charge at particular temperatures for the operating redox flow battery 101. However, choosing among these estimates is often wise, e.g., based on temperature, as is using a blended value, for example, based on weighting applied to each, because the state parameter estimate will be more accurate than simply using one sensor alone.

An embodiment trains a threshold function, for example a function that estimates when color changes with respect to state of charge, i.e., the state parameter of interest in this non-limiting example. For example, in a discharged state the color of an electrolyte solution may change noticeably when compared to the electrolyte solution's color in a more charged state. Thus, the state of charge may be related to color of the electrolyte solution in different discharge states as $S_{discharge} = e$, color 1; and, $S_{discharge} = f$, color 2, where "e" and "f" are different numerical estimates of the state of charge and "color 1" and "color 2" are different colors of the electrolyte solution associated with "e" and "f," respectively.

The threshold function may be useful in confirming if a particular estimate of the state of charge (or other parameter of interest) is accurate. For example, by applying different weights to various sensor-based estimates, an embodiment may estimate a particular value for the state of charge. This value may be known to be correlated with a color change for a particular electrolyte solution. Thus, an optical sensor may be used to increase the confidence of the estimate of the state of charge by confirming the color of the electrolyte solution is as predicted.

An embodiment may implement an error function with respect to an operational condition, e.g., temperature. That is, an embodiment may increase the confidence of a state of charge estimate for a given sensor at a given operational condition. For example, an embodiment may divide temperature ranges into buckets ($T_1, T_2, T_3, \ldots$), where, for each bucket, an embodiment computes the error in estimating the state of charge using particular sensed characteristics, e.g., $S_k$ and $S_P$ as $E_K(T)$ and $E_P(T)$, respectively. For each bucket, an embodiment identifies which sensor(s) provide a more accurate estimate of the state of charge of the redox flow battery 101 and denotes the sensor(s) as "sensor (T)."

During run-time, an embodiment detects the temperature, T, e.g., using temperature sensor S3 of FIG. 1, identifies the correct sensor(s) to use according to sensor(T) calculation, in this non-limiting example of two competing sensed data points from either conductivity or potentiometer sensors. If the estimated state of charge is less than value "e" or larger than value "f," i.e., the threshold function indicates the estimated value for the state of charge is within a predetermined range, an embodiment may further confirm the state of charge estimate with an optical sensor that detects color change expected in the given charge/discharge range, based on the estimated state of charge value.

In a data blending phase, an embodiment combines the estimated values of the relevant state parameter, in the above example the state of charge, generated using different sensor data and having different accuracies depending on various operating conditions of the battery, such as temperate, as described herein. Machine learning algorithms are used by an embodiment to find weights for each estimated value of the state parameter, e.g., state of charge.

An embodiment utilizes the weighted estimate values in a final estimation phase. That is, using the weights determined for each sensor based estimate of the state parameter of interest, and taking into consideration observed operating conditions such as temperature, an embodiment produces a final and more accurate estimate for the state parameter of interest.

Figure 2:
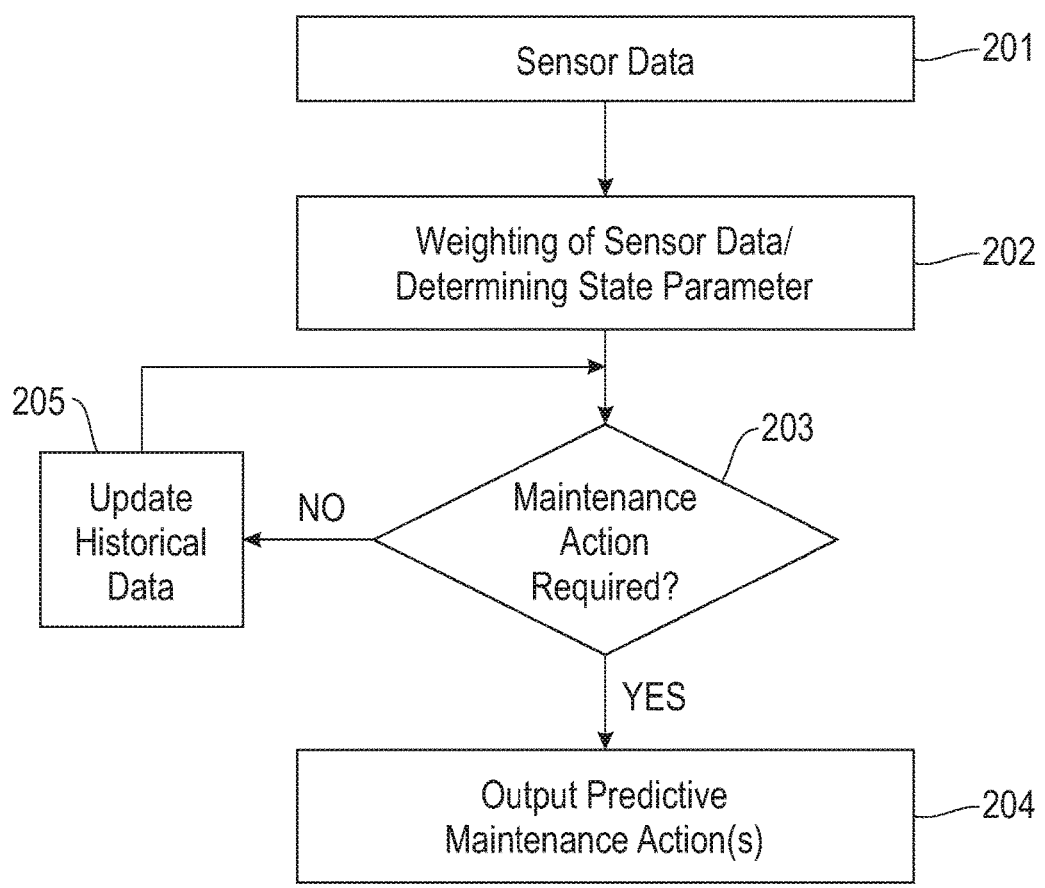
FIG. 2 illustrates an example method for condition monitoring of redox flow batteries and determining predictive maintenance actions.

As illustrated in FIG. 2, an embodiment may utilize the weighted sensor data, and particularly as it has been transformed into an estimated state parameter, in predicting or recommending maintenance action(s) for the redox flow battery 101. In the example of FIG. 2, sensor data, e.g., from sensors S1-S6, is obtained. As described herein, the sensor data may be weighted, e.g., based on an operating condition such as temperature, known reliability of the sensor data for a state parameter of interest, etc., at 202 in the process of using the sensor data to determine an estimate of the state parameter of interest.

The estimated value for the state parameter, as well as other data such as historical data relating to past work orders for the redox flow battery, outage data and/or demand profiles from an energy management system, etc., may be utilized in determining that a predictive maintenance action or actions are recommended at 203. If a predictive maintenance action is required, an embodiment may output the predictive maintenance action at 204, e.g., communicate it to a device interface, a mobile application, or the like. If no predictive maintenance action is determined, an update may be made at 205 such that the sensor data, the estimated state parameter values, etc., are available to the analytics engine for future reference.

Figure 3:
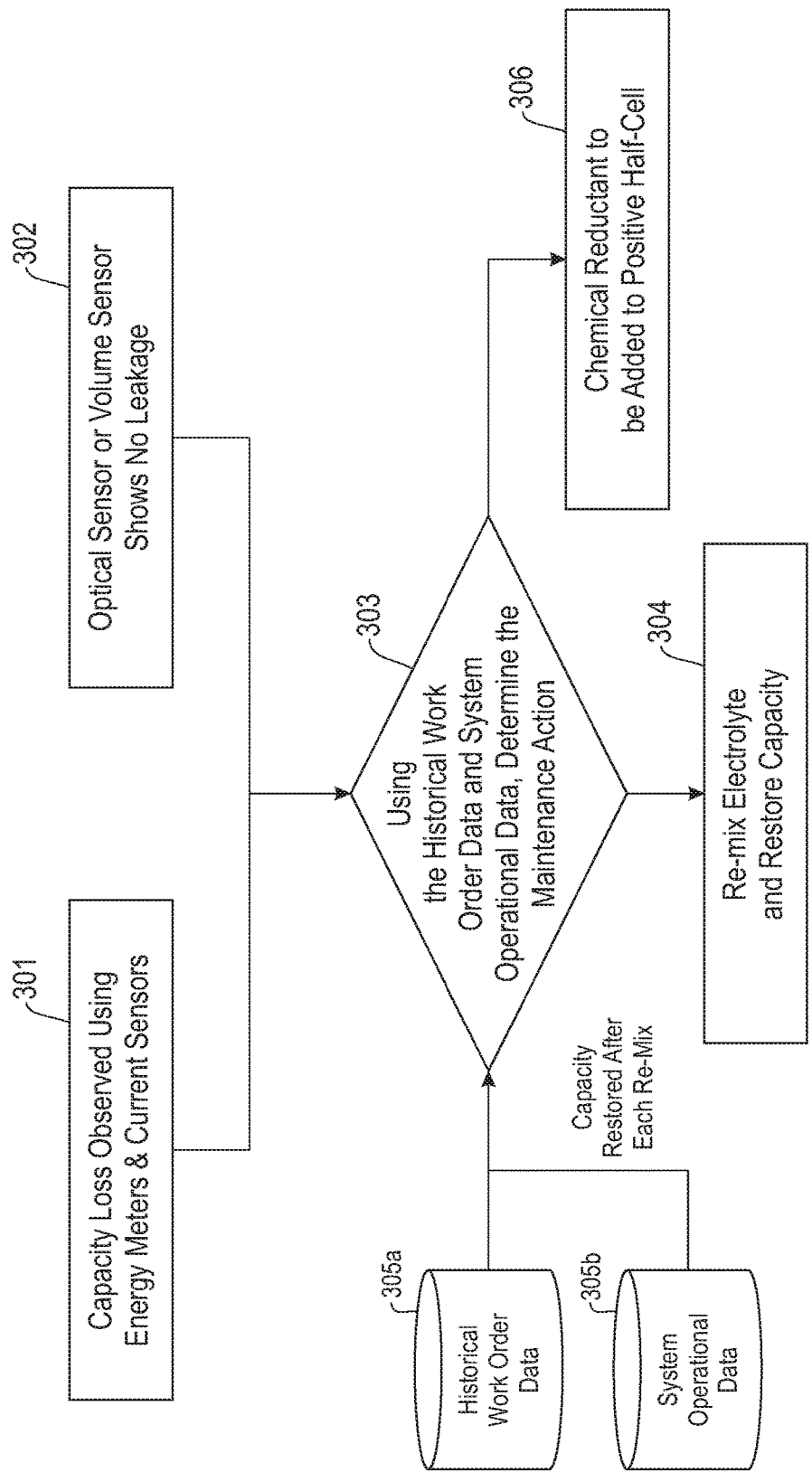
FIG. 3 illustrates examples of predictive maintenance actions using sensed data from a redox flow battery and data analytics.

FIG. 3 provides a specific example of two predictive maintenance actions determined using different sensor data, estimated state parameters, and reference data (here, system operational data and historical work order data). In the example of FIG. 3, capacity loss is observed using energy meters and current sensors as indicated at 301. At the same time (or within a relevant time frame), optical sensors and/or electrolyte volume sensors indicate that no leak has occurred in an electrolyte storage tank, as indicated at 302.

This sensor data are used, e.g., in a sensor blending technique, as described herein, to determine a predictive maintenance action, as indicated at 303. Additionally, historical work order data 305*a* (e.g., indicating if an electrolyte tank as recently been repaired, an electrolyte has not been mixed for a threshold amount of time, a chemical reductant has not been added for a threshold amount of time, etc.) as well as system operational data 305*b* (e.g., indicating that a system power requirement is imminent, a window of time for maintenance is expected in a future time slot, etc.) is available to an analytics engine.

Based on the sensor data 301, 302 as well as the historical work order data 305*a* and/or system operational data 305*b*, an embodiment uses the data available regarding the redox flow battery to determine a future or predictive maintenance task, as indicated at 303.

In one example, the data available to the analytics engine may counsel re-mixing of the electrolyte to restore the capacity loss sensed at 301. Thus, since no leak is sensed, as indicated at 302, and capacity has been restored previously via re-mixing, a further re-mixing of the electrolyte may be called for. The accuracy of this prediction may be increased based on other data, e.g., historical work order data 305*a* indicating that the electrolyte has not been remixed recently.

In another example, the data available to the analytics engine may counsel addition of a chemical reductant to the positive half-cell of the redox flow battery to restore the capacity loss sensed at 301, as indicated at 306. Thus, since no leak is sensed, as indicated at 302, addition of a chemical reductant may be called for. For example, the energy demand in the near future for the redox flow battery may counsel against a maintenance task of long duration. Therefore, system operational data 305*b* may indicate that a short term maintenance action is preferable.

The various embodiments represent a technical improvement in condition monitoring of redox flow batteries by applying an IOT-based solution to the problem of predictive maintenance. In an embodiment, the redox flow battery is monitored over time to achieve a calibrated estimation system, e.g., of the expected maximum capacity of the redox flow battery. Based on sensor readings over time, e.g., indicative of a reduction in capacity, multiple potential causes may be identified.

Thus, an embodiment provides tracking of maintenance work, e.g., electrolyte remixing to partially restore the redox flow battery's capacity, such that updated sensor data from the redox flow battery may be utilized for improved predictions for maintenance actions. This allows for improved maintenance of the redox flow battery in terms of which maintenance actions are taken, and when these maintenance actions are implemented.

The various estimates, e.g., of state parameters, and predictions, e.g., of appropriate maintenance tasks, may be performed by a programmed computer system. In this regard, FIG. 4 provides a non-limiting example of such a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA)

bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for predicting maintenance of a redox flow battery, the method comprising:

receiving, from a plurality of sensors, data regarding characteristics of the redox flow battery, wherein the characteristics identify the state of a parameter of the redox flow battery and comprise electrical characteristics, environmental characteristics, and battery level characteristics;

forming an estimated state parameter for the redox flow battery by weighting each of the characteristics and aggregating the weighted characteristics, wherein the estimated state parameter indicates an operational state of the redox flow battery;

the forming an estimated state parameter comprising utilizing a model that is trained using a plurality of sensor measurements from a plurality of different sensors measuring different characteristics of the redox flow battery and taken at known state parameters of the redox flow battery to weight characteristics and estimate state parameters, wherein to weight the characteristics is based upon an accuracy of a value provided by the sensor corresponding to the characteristic, the accuracy being determined using a machine learning algorithm;

determining, using the processor, a maintenance action for the redox flow battery using the estimated state parameter, wherein the determining comprises analyzing the estimated state parameter against historical work order data and in view of utilities operation information to identify a maintenance action corresponding to the estimated state parameter; and providing a recommendation of the determined maintenance action.

2. The method of claim 1, wherein the estimated state parameter comprises state of charge of the redox flow battery.

3. The method of claim 2, comprising receiving operational history data for the redox flow battery;
wherein the determining takes into account the operation history data.

4. The method of claim 2, comprising receiving predicted operational load data for the redox flow battery;
wherein the determining takes into account the predicted operational load data.

5. The method of claim 2, wherein the data regarding characteristics of the redox flow battery are selected from the group consisting of: temperature data, current data, voltage data, conductivity data, potentiometeric data, and optical data.

6. The method of claim 5, comprising:
training a regression model for estimating the state of charge using a conductivity characteristic of the redox flow battery;
training the regression model for estimating the state of charge using a potentiometeric characteristic of the redox flow battery;
training a threshold function that estimates an electrolyte color change with respect to the state of charge of the redox flow battery; and
utilizing temperature buckets to identify which of the plurality of sensors provides a most accurate estimate of the state of charge of the redox flow battery for a given temperature.

7. The method of claim 6, wherein the weighting comprises:
measuring a current temperature of the redox flow battery using a temperature sensor;

identifying a sensor of the plurality of sensors that provides the most accurate estimate of the state of charge at the current temperature;

determining if the estimate of the state of charge is within a predetermined range associated with electrolyte color change; and responsive to determining if the estimate of the state of charge is within the predetermined range, performing a confirming measurement with an optical sensor.

8. The method of claim 1, wherein the maintenance action is selected from the group consisting of electrolyte remixing, electrode replacement, electrode cleaning, adding a reductant, adding inert gas, electrolyte refilling, tank replacement, pump replacement, leak fixing, and electrolyte modification.

9. The method of claim 1, wherein the redox flow battery is a vanadium redox flow battery.

10. An apparatus for predicting maintenance of a redox flow battery, the apparatus comprising:

at least one processor; and a non-transitory computer readable storage medium having computer readable program code embodied therewith and executable by the at least one processor, the computer readable program code comprising:

computer readable program code that receives, from a plurality of sensors, data regarding characteristics of the redox flow battery, wherein the characteristics identify the state of a parameter of the redox flow battery and comprise electrical characteristics, environmental characteristics, and battery level characteristics;

computer readable program code that forms an estimated state parameter for the redox flow battery by weighting each of the characteristics and aggregating the weighted characteristics, wherein the estimated state parameter indicates an operational state of the redox flow battery;

the forming an estimated state parameter comprising utilizing a model that is trained using a plurality of sensor measurements from a plurality of different sensors measuring different characteristics of the redox flow battery and taken at known state parameters of the redox flow battery to weight characteristics and estimate state parameters, wherein to weight the characteristics is based upon an accuracy of a value provided by the sensor corresponding to the characteristic, the accuracy being determined using a machine learning algorithm;

computer readable program code that determines a maintenance action for the redox flow battery using the estimated state parameter, wherein the determining comprises analyzing the estimated state parameter against historical work order data and in view of utilities operation information to identify a maintenance action corresponding to the estimated state parameter; and computer readable program code that provides a recommendation of the determined maintenance action.

11. A computer program product for predicting maintenance of a redox flow battery, the computer program product comprising:

a non-transitory computer readable storage medium having computer readable program code embodied therewith, the computer readable program code being executable by a processor and comprising:

computer readable program code that receives, from a plurality of sensors, data regarding characteristics of the redox flow battery, wherein the characteristics identify the state of a parameter of the redox flow battery and comprise electrical characteristics, environmental characteristics, and battery level characteristics;

computer readable program code that forms an estimated state parameter for the redox flow battery by weighting each of the characteristics and aggregating the weighted characteristics, wherein the estimated state parameter indicates an operational state of the redox flow battery;

the forming an estimated state parameter comprising utilizing a model that is trained using a plurality of sensor measurements from a plurality of different sensors measuring different characteristics of the redox flow battery and taken at known state parameters of the redox flow battery to weight characteristics and estimate state parameters, wherein to weight the characteristics is based upon an accuracy of a value provided by the sensor corresponding to the characteristic, the accuracy being determined using a machine learning algorithm;

computer readable program code that determines a maintenance action for the redox flow battery using the estimated state parameter, wherein the determining comprises analyzing the estimated state parameter against historical work order data and in view of utilities operation information to identify a maintenance action corresponding to the estimated state parameter; and computer readable program code that provides a recommendation of the determined maintenance action.

12. The computer program product of claim 11, wherein the estimated state parameter comprises state of charge of the redox flow battery.

13. The computer program product of claim 12, comprising computer readable program code that receives operational history data for the redox flow battery;

wherein the computer readable program code that determines a maintenance action takes into account the operation history data.

14. The computer program product of claim 12, comprising computer readable program code that receives predicted operational load data for the redox flow battery;

wherein the computer readable program code that determines a maintenance action takes into account the predicted operational load data.

15. The computer program product of claim 12, wherein the data regarding characteristics of the redox flow battery are selected from the group consisting of: temperature data, current data, voltage data, conductivity data, potentiometeric data, and optical data.

16. The computer program product of claim 15, comprising:

computer readable program code that trains a regression model for estimating the state of charge using a conductivity characteristic of the redox flow battery;

computer readable program code that trains the regression model for estimating the state of charge using a potentiometeric characteristic of the redox flow battery;

computer readable program code that trains a threshold function that estimates an electrolyte color change with respect to the state of charge of the redox flow battery; and computer readable program code that utilizes temperature buckets to identify which of the plurality of sensors provides a most accurate estimate of the state of charge of the redox flow battery for a given temperature.

17. The computer program product of claim 16, wherein the computer readable program code that weights comprises:

computer readable program code that measures a current temperature of the redox flow battery using a temperature sensor;

computer readable program code that identifies a sensor of the plurality of sensors that provides the most accurate estimate of the state of charge at the current temperature;

computer readable program code that determines if the estimate of the state of charge is within a predetermined range associated with electrolyte color change; and computer readable program code that, responsive to determining the estimate of the state of charge is within the predetermined range, performs a confirming measurement with an optical sensor.

18. The computer program product of claim 11, wherein the maintenance action is selected from the group consisting of electrolyte remixing, electrode replacement, electrode cleaning, adding a reductant, adding inert gas, electrolyte refilling, tank replacement, pump replacement, leak fixing, and electrolyte modification.

19. The computer program product of claim 11, wherein the redox flow battery is a vanadium redox flow battery.

20. A system for predicting maintenance of a redox flow battery, the method comprising:

a redox flow battery operatively coupled to a commercial power grid; and an apparatus comprising:

at least one processor; and a non-transitory computer readable storage medium having computer readable program code embodied therewith and executable by the at least one processor, the computer readable program code comprising:

computer readable program code that receives, from a plurality of sensors, data regarding characteristics of the redox flow battery, wherein the characteristics identify the state of a parameter of the redox flow battery and comprise electrical characteristics, environmental characteristics, and battery level characteristics;

computer readable program code that forms an estimated state parameter for the redox flow battery by weighting each of the characteristics and aggregating the weighted characteristics, wherein the estimated state parameter indicates an operational state of the redox flow battery;

the forming an estimated state parameter comprising utilizing a model that is trained using a plurality of sensor measurements from a plurality of different sensors measuring different characteristics of the redox flow battery and taken at known state parameters of the redox flow battery to weight characteristics and estimate state parameters, wherein to weight the characteristics is based upon an accuracy of a value provided by the sensor corresponding to the characteristic, the accuracy being determined using a machine learning algorithm;

computer readable program code that determines a maintenance action for the redox flow battery using the estimated state parameter, wherein the determining comprises analyzing the estimated state parameter against historical work order data and in view of utilities operation information to identify a maintenance action corresponding to the estimated state parameter; and computer readable program code that provides a recommendation of the determined maintenance action.

* * * * *